United States Patent
Seto

(10) Patent No.: US 7,627,885 B2
(45) Date of Patent: Dec. 1, 2009

(54) IN-VEHICLE IMAGE DISPLAY SYSTEM

(75) Inventor: Ohisa Seto, Anjo (JP)

(73) Assignee: DENSO CORPORATION, Kariya (JP)

( * ) Notice: Subject to any disclaimer, the term of this patent is extended or adjusted under 35 U.S.C. 154(b) by 868 days.

(21) Appl. No.: 11/010,379

(22) Filed: Dec. 14, 2004

(65) Prior Publication Data

US 2005/0138662 A1 Jun. 23, 2005

(30) Foreign Application Priority Data

Dec. 18, 2003 (JP) ............................. 2003-421543
Nov. 16, 2004 (JP) ............................. 2004-332403

(51) Int. Cl.
*H04N 7/18* (2006.01)
(52) U.S. Cl. .............................. 725/75; 725/76; 725/77
(58) Field of Classification Search ............. 725/75–77, 725/78, 83, 141, 153; 348/75, 148
See application file for complete search history.

(56) References Cited

U.S. PATENT DOCUMENTS 5,959,630 A 9/1999 Takeuchi et al.
6,813,777 B1* 11/2004 Weinberger et al. ........... 725/76
7,114,171 B2* 9/2006 Brady et al. ................... 725/77
7,123,131 B2* 10/2006 Arai ........................ 340/425.5
2002/0047900 A1* 4/2002 Nishiyama et al. .......... 348/148
2003/0074665 A1* 4/2003 Varley ......................... 725/78

FOREIGN PATENT DOCUMENTS

JP A-11-249555 9/1999

* cited by examiner

Primary Examiner—Joseph P Hirl
Assistant Examiner—An Nguyen
(74) Attorney, Agent, or Firm—Posz Law Group, PLC

(57) ABSTRACT

In an in-vehicle image display system, each of a car navigation device and a rear-seat display device includes an own image-drawing IC. The car navigation device interfaces with a TV tuner and a DVD player. When receiving a request signal from the rear-seat display device, the car navigation device forwards relevant image data to the rear-seat display device using a dedicated line. The rear-seat display device converts the forwarded image data to image signals using the own image-drawing IC to thereby display them. Thus, the car navigation device and the rear-seat display device can display different display window images with a simple system structure where no image-drawing IC used for the rear-seat display device is provided within the car navigation device.

12 Claims, 10 Drawing Sheets

IN-VEHICLE IMAGE DISPLAY SYSTEM

CROSS REFERENCE TO RELATED APPLICATIONS

This application is based on and incorporates herein by reference Japanese Patent Applications No. 2003-421543 filed on Dec. 18, 2003 and No. 2004-332403 filed on Nov. 16, 2004.

FIELD OF THE INVENTION

The present invention relates to an in-vehicle image display system that displays images outputted from multiple devices mounted on a vehicle.

BACKGROUND OF THE INVENTION

There is a vehicle that is equipped with not only a display for a front seat but also a display for a rear seat. For instance, a known in-vehicle display system can provide images from an in-vehicle device not only to an occupant in the front seat but also to an occupant in the rear seat.

In this system, a front-seat display device displays image data outputted from a TV tuner or the like; further, a rear-seat display device interfacing with the front-seat display device displays the image data that is displayed on the front-seat display device by obtaining it from the front-seat display device. Thus, when a user operates the TV tuner to cause the front-seat display device to display images, the same images can be displayed on the rear-seat display device via the front-seat display device. Not only an occupant in the front seat but also an occupant in the rear seat can thereby enjoy the images outputted from the TV tuner.

In this system, the rear-seat display device directly displays the same images as the images obtained from the front-seat display device, so that the front-seat display device and the rear-seat display device cannot display different images therebetween. That is, it is impossible that images from the TV are viewed in the front-seat while images from a DVD are viewed in the rear seat. To solve this, the front-seat display device can include an additional image drawing device for a rear-seat display device. Images for the front-seat display device and images for the rear-seat display device can be drawn by the corresponding image drawing devices, respectively. However, this method requires an image drawing device for the rear-seat display device regardless of whether a rear-seat display device is disposed or not, complicating a structure of the front-seat display device. Further, it is unfavorable in costs and designing.

SUMMARY OF THE INVENTION

It is an object of the present invention to provide an in-vehicle image display system that is capable of having difference in a display image between a front-seat display device and a rear-seat display device, under a simple system structure.

To achieve the above object, an in-vehicle image display system is provided with the following. The system includes a single primary display device and at least one secondary display device. The primary display device includes a first display screen and a first image-drawing unit, while the secondary display device includes a second display screen and a second image-drawing unit. Here, the primary display device obtains, from among image data outputted from a plurality of apparatuses provided in a vehicle, first image data that is to be displayed on the first display screen and second image data that is to be displayed on the second display screen in the secondary display device. The primary display device then transfers the obtained second image data to the second display device. Further, the first image-drawing unit performs drawing of the first image data on the first display screen, while the second image-drawing unit performs drawing of the second image data on the second display screen.

In the above structure, the primary display device does not need to include an image-drawing unit for the second display device. This enables a simple system structure to cause the primary display device and the secondary display device to display the images different from each other, respectively. Further, this is favorable in costs and designing.

In another aspect of the present invention, an in-vehicle image display system is provided with the following. The system includes a first display device, a second display device, and a dedicated line that interfaces with the first display device and the second display device to thereby dedicatedly communicate a signal relating to image data. The first display device obtains, for displaying, image data outputted from each of a plurality of apparatuses provided in a vehicle. The first display device includes a first display unit, a first storing unit that stores the obtained image data, and a first display control unit that generates a display control signal to the first display unit, based on the image data stored in the first display unit. The second display device obtains, for displaying, image data outputted from each of the plurality of apparatuses. The second display device includes a second display unit, a second storing unit that stores the obtained image data, and a second display control unit that generates a display control signal to the second display unit, based on the image data stored in the second display unit.

In this structure, each of the first display device and the second display device includes a storing unit and a display control unit that are necessary for displaying images on a respective display unit. When only one of the two display devices is installed, the only one device therefore includes the minimum components for displaying the images. As a result, not only when multiple display devices are installed, but also when only one display device is installed, the system can be optimized. Further, installing a dedicated line that dedicatedly communicates signals relating to image data between the first and second display devices enables a high speed for transmitting the image signals. Thus, for instance, a menu window for manipulating apparatuses can be rapidly displayed, which can prevent deterioration in user's usability.

BRIEF DESCRIPTION OF THE DRAWINGS

The above and other objects, features, and advantages of the present invention will become more apparent from the following detailed description made with reference to the accompanying drawings. In the drawings.

DETAILED DESCRIPTION OF THE PREFERRED EMBODIMENTS

First Embodiment

Figure 1:
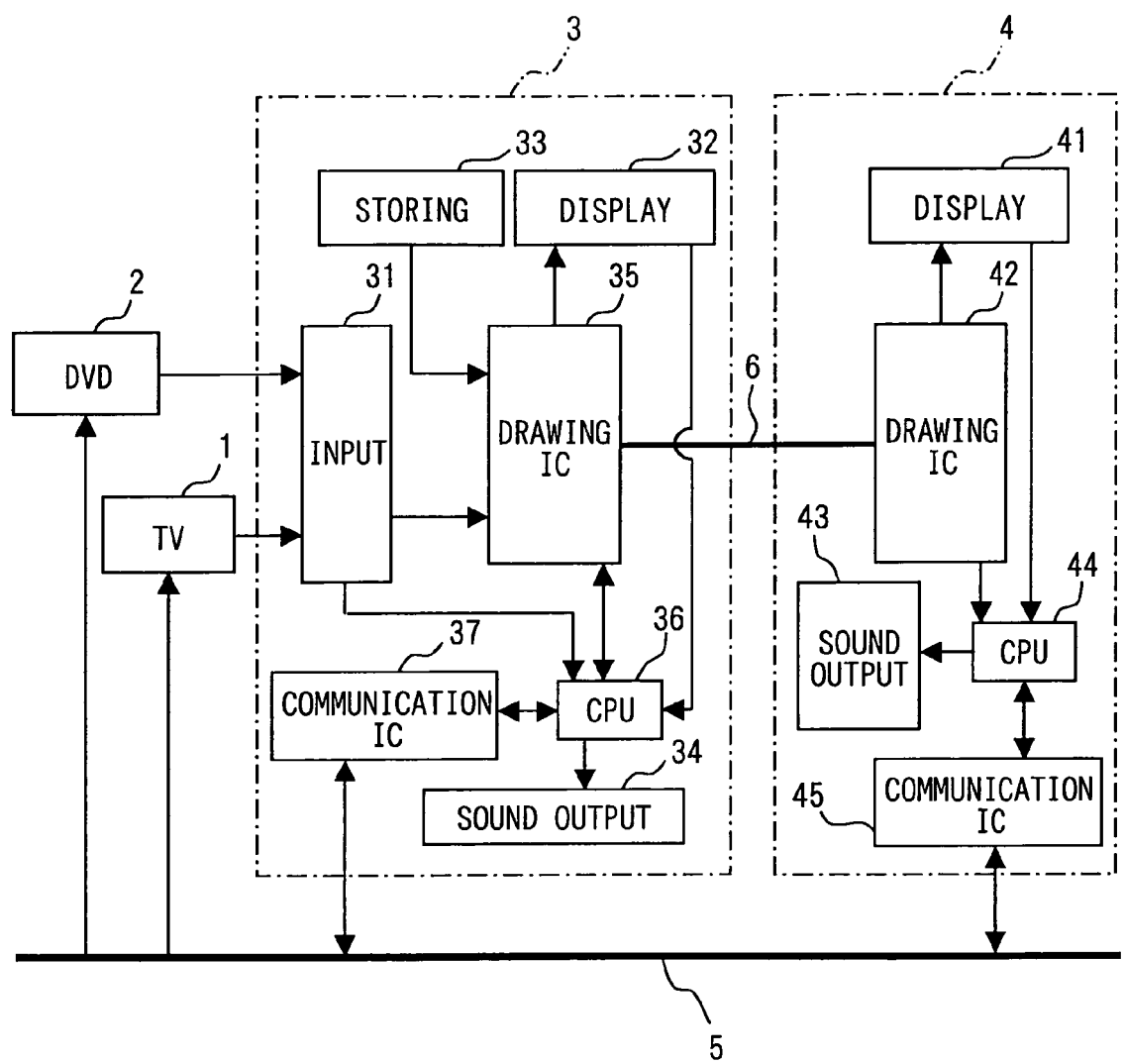
FIG. 1 is a block diagram showing an overall structure of an in-vehicle image display system according to a first embodiment of the present invention.

The present invention is directed to an in-vehicle image display system as a first embodiment. The in-vehicle image display system is operated by being interfaced with an image apparatus mounted in a vehicle. As shown in FIG. 1, the system uses a car navigation device 3 as a front-seat display and a rear-seat display device 4 as a rear-seat display. These devices 3, 4, a TV tuner 1, and a DVD player 2 interface with each other via an in-vehicle local area network (LAN) 5 in the vehicle, to thereby communicate manipulation signals, request signals, sound data, etc. under a simple structure using the LAN 5. The car navigation device 3 interfaces with the rear-seat display device 4 via a dedicated line 6. The car navigation device 3 obtains image data outputted from the TV tuner 1 and the DVD player 2 to forward the obtained image data to the rear-seat display device 4 via the dedicated line 6.

The TV tuner 1 and the DVD player 2 will be explained below. The TV tuner 1 includes a wave-detection and amplification circuit, an image-data generation circuit, a sound-data generation circuit, and a control circuit that controls the foregoing circuits (non shown). As known, the wave-detection and amplification circuit executes wave detection and amplification for TV radio waves received from an outside of the vehicle, while the image-data generation circuit and the sound-data generation circuit generate, for a set channel, TV image data and TV sound data, respectively. The generated TV image data and TV sound data are outputted to the car navigation device 3. Further, when receiving a channel selection signal from the car navigation device 3 or the rear-seat display device 4 via the LAN 5, the TV tuner 1 changes into a channel corresponding to the received channel selection signal.

The DVD player 2 includes a data-reading circuit, an image-data generation circuit, a sound-data generation circuit, and a control circuit that controls the foregoing circuits (non shown). As known, the data-reading circuit reads digital data stored in a DVD medium, while the image-data generation circuit and the sound-data generation circuit generate DVD image data and DVD sound data, respectively. The generated DVD image data and DVD sound data are outputted to the car navigation device 3. Further, when receiving a manipulation signal from the car navigation device 3 or the rear-seat display device 4 via the LAN 5, the DVD player 2 reproduces or fast forwards moving images corresponding to the received manipulation signal.

Next, the car navigation device 3 of the front-seat display will be explained below in detail. An external input circuit 31 includes image input terminals and sound input terminals (non shown), and interfaces with image output terminals and sound output terminals (non shown) of each of the TV tuner 1 and the DVD player 2 via communication lines (not shown). The TV image data and TV sound data outputted from the TV tuner 1 and the DVD image data and DVD sound data outputted from the DVD player 2 are thereby obtained via the communication lines, respectively. Here, these data can be also obtained using wireless communications.

A touch display 32 includes a signal input circuit, a liquid crystal display panel, and a contact-type touch switch (non shown), and displays images on the liquid crystal display panel based on the image signals inputted from the signal input circuit. In this case, the touch display 32 also displays a navigation window switch button for switching a display window into a navigation window, a TV window switch button for switching a display window into a TV window, and a DVD window switch button for switching a display window into a DVD window. Further, a channel selection button is displayed for selecting a TV channel, while a menu window switch button is displayed changing a display window into a menu window that includes manipulation buttons for reproducing and stopping of the DVD player 2 or the like. Here, the menu window can display a navigation menu window for setting various functions and selecting a destination in the car navigation device 3.

The touch display 32, as a display unit or display screen, outputs a touch position signal representing a corresponding position when a user touches a touch switch. Thus, the user can easily perform switching of display windows or various manipulation by only touching the display. Here, displaying images can be also achieved by using a compact-sized CRT or a vehicular head-up display that displays images on a windshield. Further, switching windows or various manipulation can be also performed by using a remote controller or the like.

An image-data storing device 33 is, for instance, constructed of a hard disk drive to store map information including road information, building information, a real address information and post code information; map image data that is used for generating navigation image data. Further, the image-data storing device 33 stores image data of a menu window that includes a channel selection button for selecting a channel of the TV tuner 1 and a manipulation button for reproducing and stopping the DVD player 2. Here, the foregoing data can be also stored in a DVD-ROM or the like. Further, the menu window can be individually prepared for each of devices and stored in the image-data storing device 33.

A sound output device 34 includes a sound-data input circuit and a sound conversion circuit (non shown). The sound conversion circuit converts the sound data inputted by the sound-data input circuit, to sounds to be outputted from a speaker (not shown). Here, the sounds can be also outputted by using a headphone or the like.

Figure 2:
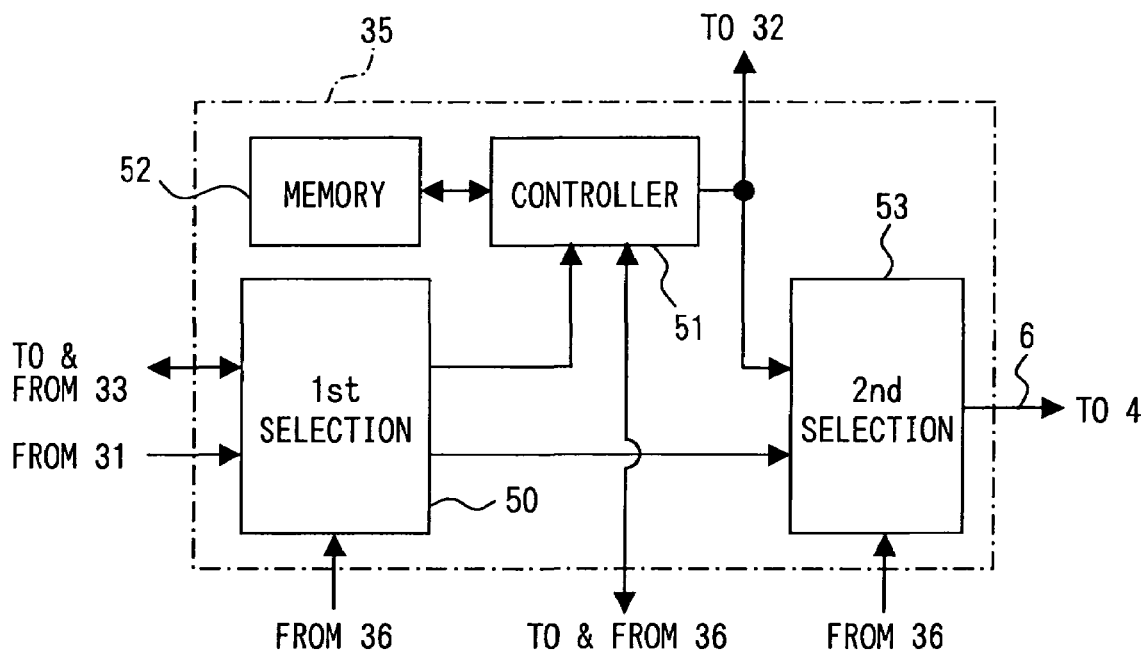
FIG. 2 is a block diagram showing an internal structure of an image-drawing IC in a car navigation device according to the first embodiment.
Figure 3:
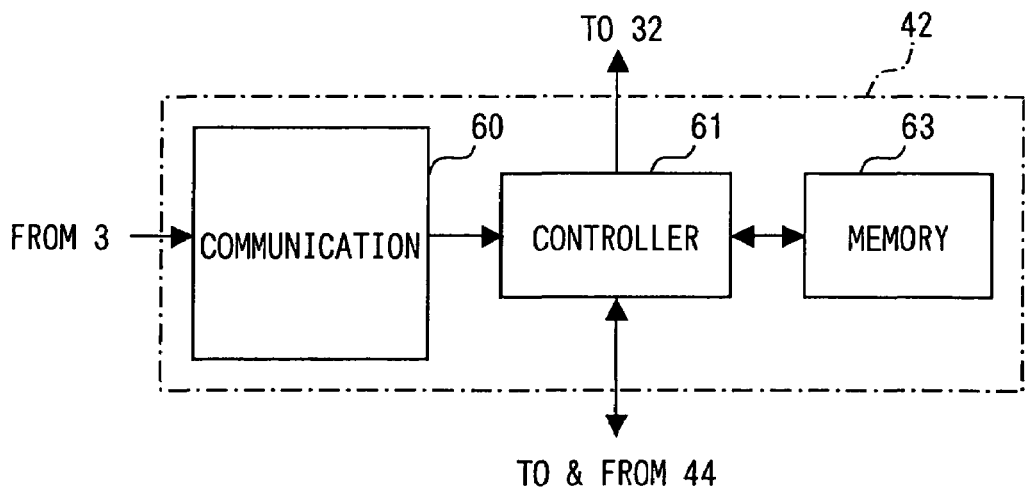
FIG. 3 is a block diagram showing an internal structure of an image-drawing IC in a rear-seat display device according to the first embodiment.

An image-drawing IC 35 includes a display controller 51 that generates image signals for displaying images on the touch display 32 based on the image data, as shown in FIG. 2, to perform image drawing and window switching on the touch display 32 based on each window display instruction obtained from a CPU 36.

In detail, when obtaining a navigation window display instruction from the CPU 36, the display controller 51 reads map image data surrounding the vehicle from the image-data storing device 33 via a first selection circuit 50 based on a detection result from a position detector (not shown). The display controller 51 also generates navigation image data on which an own vehicle mark is superimposed to then store it in a video memory 52. The display controller 51 then generates image signals based on the navigation image data stored in the video memory 52 to output (or draw) it on the touch display 32. Here, the first selection circuit 50 selects image data that is to be displayed on the touch display 32 in the car navigation device 3 according to the window display instruction and the window transmission instruction from the CPU 36, to thereby output the selected image data to the display controller 51. Simultaneously, the first selection circuit 50 selects image data that is to be displayed in the rear-seat display device 4 according to the window display instruction and the window transmission instruction from the CPU 36, to thereby output the selected image data to a second selection circuit 53. The second selection circuit 53 selects one of the image signals generated by the display controller 51 in the car navigation device 3 and the image data selected by the first selection circuit 50, to then transmit the selected one to the rear-seat device 4 via the dedicated line 6.

For instance, when the CPU 36 outputs a TV window display instruction or a DVD window display instruction, the image-drawing IC 35 obtains TV image data or DVD image data from the external input circuit 31 and converts the obtained data to image signals to output them to the touch display 32. Further, when the CPU 36 outputs a menu window display instruction, the image-drawing IC 35 reads menu image data from the image-data storing device 33 and converts the read data to image signals to output them to the touch display 32.

Further, when the CPU 36 outputs any one of a navigation image transmission instruction, a TV image transmission instruction, a DVD image transmission instruction, and a menu window transmission instruction, the image-drawing IC 35 obtains the image data corresponding to the outputted transmission instruction via the first selection circuit 50 and then forwards it to the rear-seat display device 4 via the second selection circuit 53 and the dedicated line 6.

The CPU 36 is constructed of a known computer, to determine which button is touched by using a touch position signal outputted from the touch display 32 and the image data that the image-drawing IC 35 is drawing on the touch display 32 to thereby output an instruction corresponding to this determination to the image-drawing IC 35.

In detail, here, suppose a case where a navigation window switch button that changes to a navigation window, a TV window switch button that changes to a TV window, a DVD window switch button that changes to a DVD window, or a menu window switch button that changes to a menu window is touched. In this case, the CPU 36 determines that the image-drawing IC 35 should draw a window corresponding to the touched button, on the touch display 32. Thus, the CPU 36 outputs a display instruction corresponding to the touched button to the image-drawing IC 35 to thereby change the window displayed on the touch display 32. Here, the CPU 36 obtains music data that is outputted along with the relevant image data to then output it to the sound output device 34. Further, when a channel selection button that selects a TV tuner channel, or a manipulation button that reproduces or stops the DVD player 2 is touched while a menu window is being displayed on the touch display 32, the CPU 36 outputs a channel selection signal or a manipulation signal corresponding to the selected one, via the communication IC 37 to the in-vehicle LAN 5.

Further, suppose a case where the CPU 36 obtains any one of a navigation window request signal, a TV window request signal, a DVD window request signal, and a menu window request signal, from the communication IC 37. In this case, the CPU 36 determines that an image-drawing IC 42 should draw a window corresponding to the obtained request signal, on a touch display 41. Thus, the CPU 36 outputs any one of a navigation window request signal, a TV window request signal, a DVD window request signal, and a menu window request signal to the image-drawing IC 35. The image-drawing IC 35 forwards the image data corresponding to the obtained request signal to the rear-seat display device 4 by using the first and second selection circuits 50, 53. Further, the CPU 36 obtains music data that is outputted along with the relevant image data to then transmit it to the rear-seat display device 4 via the in-vehicle LAN 5.

Here, the car navigation device 3 functions as a front-seat display, in addition to a function of a car navigation device. This is because eliminating of need for a separate display device enables a simple system structure.

Next, the rear-seat display device 4 of a rear-seat display will be explained in its parts below. The touch display 41 (display unit or display screen) includes a signal input circuit, a liquid crystal display panel, and a contact-type touch switch (non shown), and displays images on the liquid crystal display panel based on the image signals inputted from the signal input circuit. In this case, the touch display 41 also displays a navigation window switch button for switching a display image into a navigation window, a TV window switch button for switching a display window into a TV window, and a DVD window switch button for switching a display window into a DVD window. Further, a channel selection button is displayed for selecting a TV channel, while a menu window switch button is displayed for changing a display window into a menu window that includes manipulation buttons for reproducing and stopping of the DVD player 2 or the like. The touch display 41 outputs a touch position signal representing a corresponding position when a user touches a touch switch.

The image-drawing IC 42 includes a display controller 61 that generates image signals based on the obtained image data via a communication circuit 60. The display controller 61, further, directly outputs the image signals generated by the display controller 51 in the car navigation device 3 when receiving them. Here, the display controller 61 includes a video memory 63 to store the navigation image data, the TV image data, the DVD image data, or the menu window image data when they are forwarded via the dedicated line 6 from the car navigation device 3. The display controller 61 generates image signals based on the stored image data, to output (or draw) them to the touch display 41.

A sound output device 43 includes a sound-data input circuit and a sound conversion circuit (non shown). The sound conversion circuit converts the sound data inputted by the sound-data input circuit to sounds to be outputted from a speaker (not shown).

A CPU 44 is constructed of a known computer, to determine which button is touched by using a touch position signal outputted from the touch display 41 and the image data that the image-drawing IC 42 is drawing on the touch display 41 to thereby output a request signal corresponding to this determination to a communication IC 45.

In detail, here, suppose a case where any one of a navigation window switch button that changes to a navigation window, a TV window switch button that changes to a TV window, a DVD window switch button that changes to a DVD window, and a menu window switch button that changes to a menu window is touched. In this case, the CPU 44 determines that the image-drawing IC 42 should draw a window corresponding to the touched button on the touch display 41. Thus, the CPU 44 outputs a request signal corresponding to the touched button to the communication IC 45 to thereby cause the relevant apparatus to transmit the corresponding data to the car navigation device 3. When the channel selection button for selecting a channel of the TV tuner 1 or the manipulation button for reproducing or stopping the DVD player 2 is touched while the menu window is being displayed on the touch display 41, a channel selection signal or a manipulation signal corresponding to the touched button is outputted to the communication IC 45. Further, the CPU 44 outputs the music data obtained from the communication IC 45 to the sound output device 43.

The communication IC 45 transmits each of a navigation window request signal, a TV window request signal, a DVD window request signal, and a menu window request, which are obtained form the CPU 44, to the car navigation device 3 via the in-vehicle LAN 5. Further, the communication IC 45 transmits a channel selection signal or a manipulation signal, which is obtained from the CPU 44, to the TV tuner 1, or the DVD player 2 via the in-vehicle LAN 5. Furthermore, the communication IC 45 transmits music data received from the car navigation device 3 via the in-vehicle LAN 5, to the CPU 44.

Figure 4:
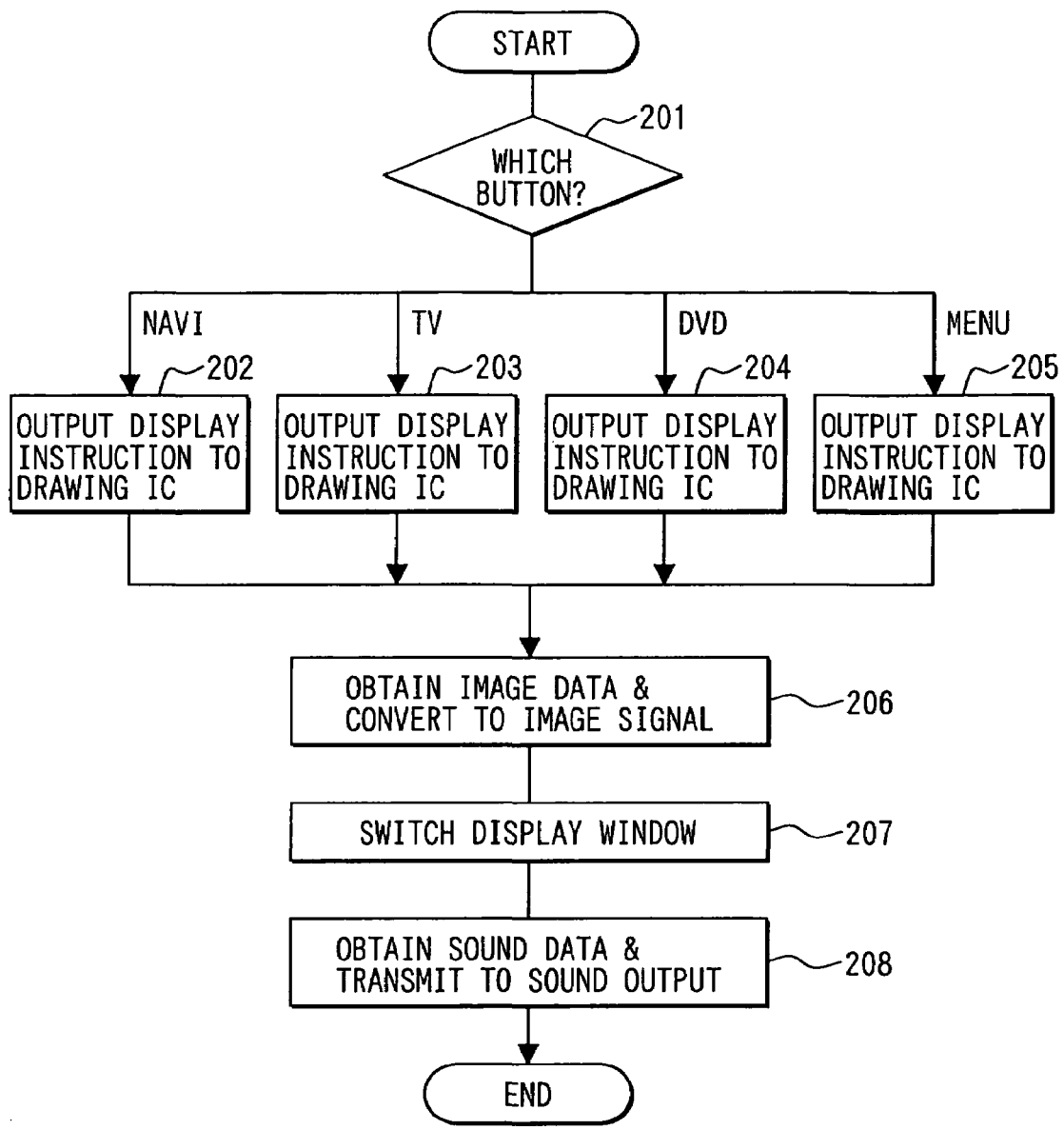
FIG. 4 is a flow chart diagram showing a process for switching display windows on a touch display in a car navigation device in the in-vehicle image display system according to the first embodiment.

Next, a process of switching a display window on the touch display 32 in the car navigation device 3 will be explained with reference to a flow chart in FIG. 4. This process is started when any one of a navigation window switch button, a TV window switch button, a DVD window switch button, and a menu window switch button on the touch display 32 in the car navigation device 3 is touched.

At Step 201, the CPU 36 determines which switch button is touched by using a touch position signal outputted from the touch display 32 and the image data that the image-drawing IC 35 is drawing on the touch display 32. When the navigation window switch button is determined to be touched, the process advances to Step 202. When the TV window switch button is determined to be touched, the process advances to Step 203. When the DVD window switch button is determined to be touched, the process advances to Step 204. When the menu window switch button is determined to be touched, the process advances to Step 205.

At Step 202, the CPU 36 outputs a navigation window display instruction to the image-drawing IC 35. At Step 203, the CPU 36 outputs a TV window display instruction to the image-drawing IC 35. At Step 204, the CPU 36 outputs a DVD window display instruction to the image-drawing IC 35. At Step 205, the CPU 36 outputs a menu window display instruction to the image-drawing IC 35.

At Step 206, the image-drawing IC 35 obtains image data corresponding to the display instruction outputted from any one of Steps 202 to 205, to then convert it to an image signal. At Step 207, the image signal converted at Step 206 is outputted to the touch display 332, to thereby cause the display window to be switched. Thus, the user can view a navigation window, a TV window, and a DVD window which are shown in the touch display 32, in addition to selecting a channel selection button or a manipulation button.

At Step 208, the CPU 36 obtains music data outputted along with the image data obtained at Step 206, and then transmits it to the sound output device 34 for switching the sound.

Figure 5:
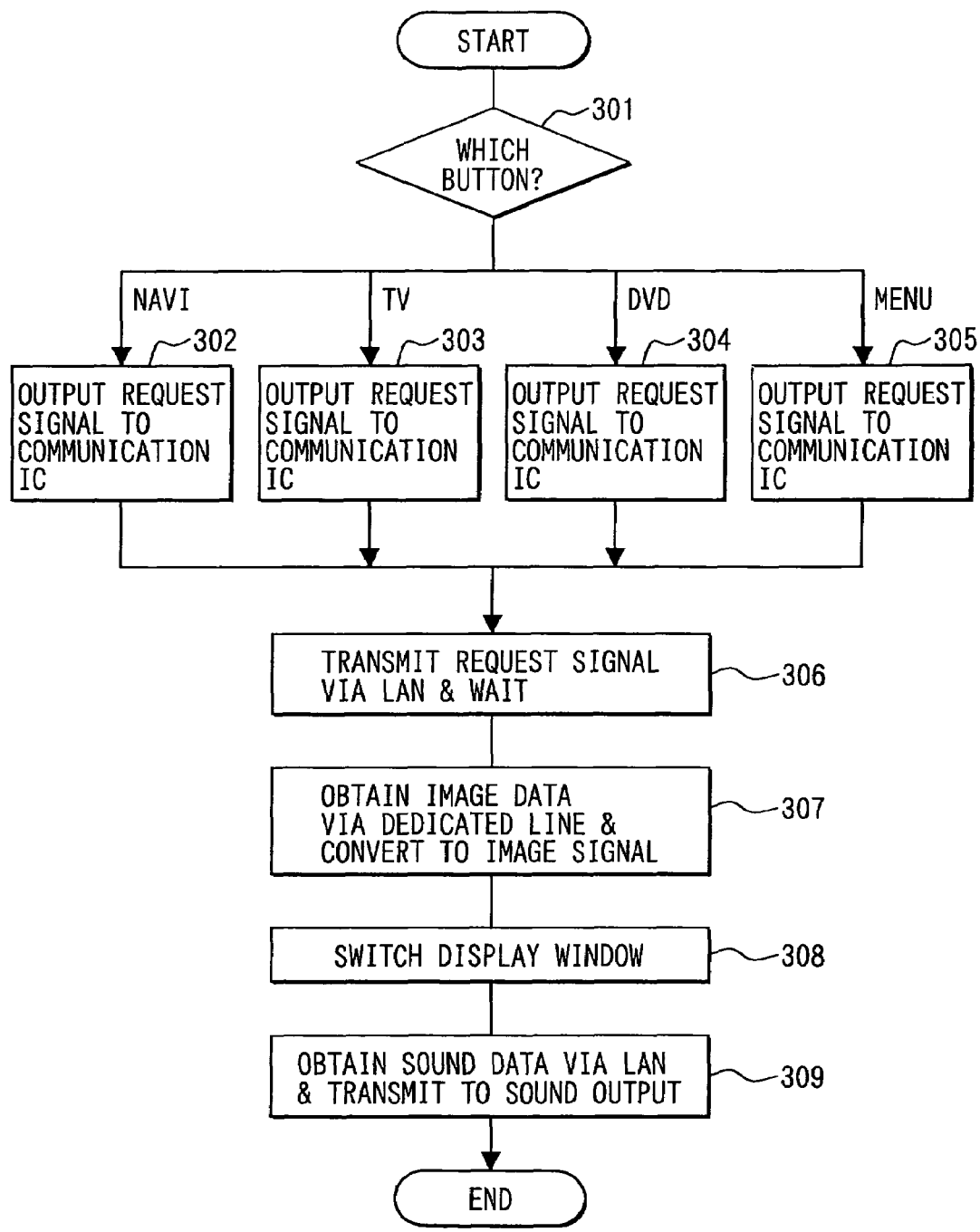
FIG. 5 is a flow chart diagram showing a process for switching display windows on a touch display in a rear-seat display device in the in-vehicle image display system according to the first embodiment.

Next, a process of switching a display window on the touch display 41 in the rear-seat display device 4 will be explained with reference to a flow chart in FIG. 5. This process is started when any one of a navigation window switch button, a TV window switch button, a DVD window switch button, and a menu window switch button on the touch display 41 in the rear-seat display device 4 is touched.

At Step 301, the CPU 44 determines which switch button is touched by using a touch position signal outputted from the touch display 41 and the image data that the image-drawing IC 42 is drawing on the touch display 41. When the navigation window switch button is determined to be touched, the process advances to Step 302. When the TV window switch button is determined to be touched, the process advances to Step 303. When the DVD window switch button is determined to be touched, the process advances to Step 304. When the menu window switch button is determined to be touched, the process advances to Step 305.

At Step 302, the CPU 44 outputs a navigation window request signal to the communication IC 45. At Step 303, the CPU 44 outputs a TV window request signal to the communication IC 45. At Step 304, the CPU 44 outputs a DVD window request signal to the communication IC 45. At Step 305, the CPU 44 outputs a menu window request signal to the communication IC 45.

At Step 306, the communication IC 45 transmits, via the in-vehicle LAN 5 to the car navigation device 3, the request signal outputted from any one of Steps 302 to 305 to then enter a waiting state.

At Step 307, the image-drawing IC 42 obtains image data forwarded from the car navigation device 3 via the dedicated line 6 to then convert it to image signals. At Step 308, the image signal converted at Step 307 is outputted to the touch display 41, to thereby cause the display window to be switched.

At Step 309, the CPU 44 obtains the music data outputted from the car navigation device 3 via the in-vehicle LAN to then transmit it to the sound output device 43 for switching the sound.

Figure 6:
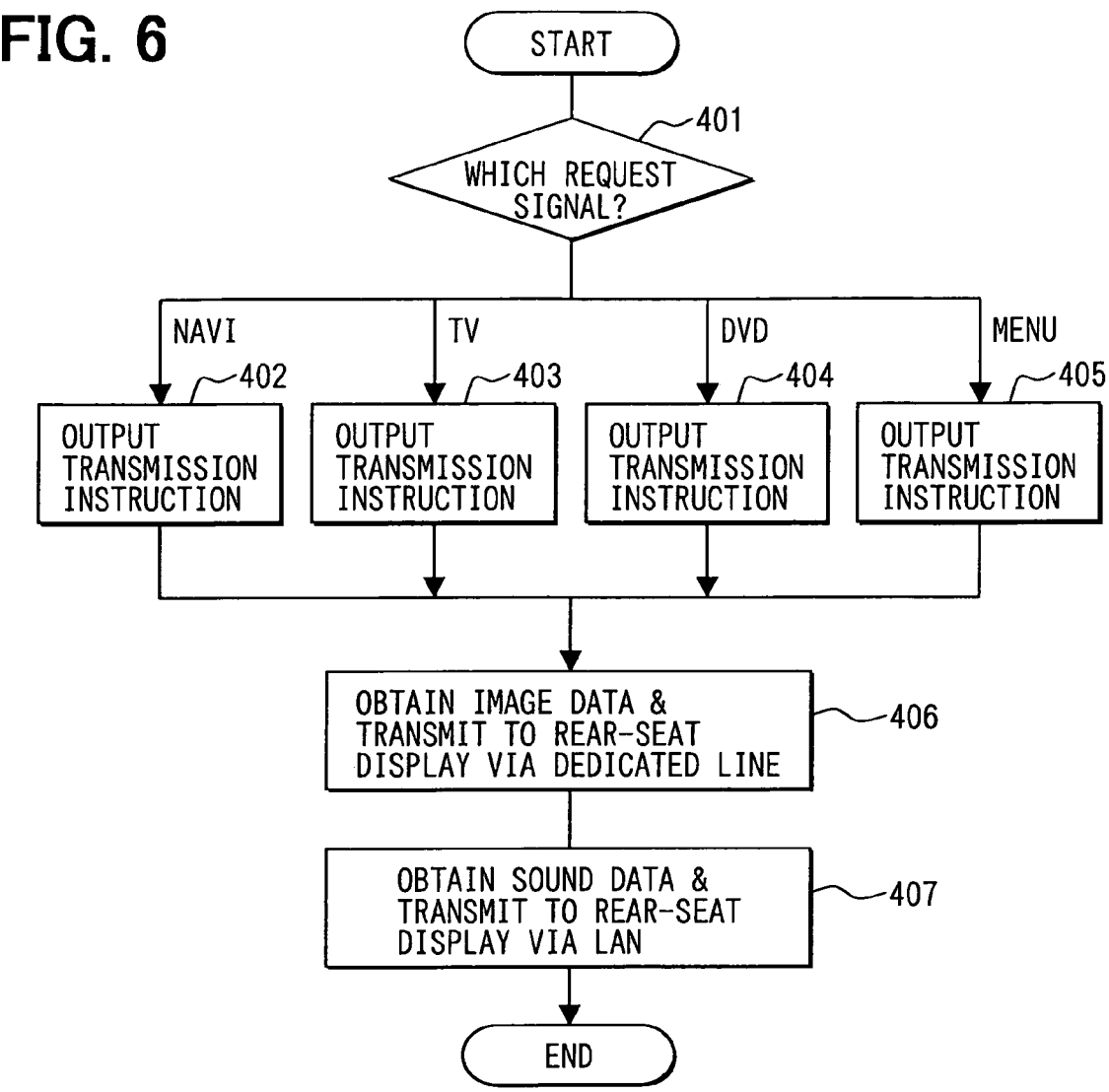
FIG. 6 is a flow chart diagram showing a process where a car navigation device transfers images to a rear-seat display device in the in-vehicle image display system according to the first embodiment.

Next, a process of forwarding image data by the car navigation device 3 to the rear-seat display device 4 will be explained with reference to a flow chart in FIG. 6. This process is started by the car navigation device 3 when receiving a request signal from the rear-seat display device 4.

At Step 401, the CPU 36 determines which request signal is obtained from the communication IC 37. When a navigation window request signal is determined to be obtained, the process advances to Step 402. When a TV window request signal is determined to be obtained, the process advances to Step 403. When a DVD window request signal is determined to be obtained, the process advances to Step 404. When a menu window request signal is determined to be obtained, the process advances to Step 405.

At Step 402, the CPU 36 outputs a navigation window transmission instruction to the image-drawing IC 35. At Step 403, the CPU 36 outputs a TV window transmission instruction to the image-drawing IC 35. At Step 404, the CPU 36 outputs a DVD window transmission instruction to the image-drawing IC 35. At Step 405, the CPU 36 outputs a menu window transmission instruction to the image-drawing IC 35.

At Step 406, the image-drawing IC 35 obtains image data corresponding to the transmission instruction outputted at any one of Steps 402 to 405, to then transmit it to the dedicated line 6. Using the dedicated line 6 enables the car navigation device 3 to transmit at a high-speed the navigation image data, the TV image data, the DVD image data, or the image data of the menu window to the rear-seat device 4.

Here, when a display request signal corresponding to the window that is being displayed in the car navigation device 3 is received, the image signals generated by the display controller 51 in the image-drawing IC 35 is transmitted via the second selection circuit 53 to the rear-seat display device 4. Here, the display controller 61 in the rear-seat display device 4 displays the requested window by directly outputting the received image signals to the touch display 41.

At Step 407, the CPU 36 obtains the music data outputted along with the sound data to then forward it to the rear-seat display device 4 via the in-vehicle LAN 5.

Figure 7:
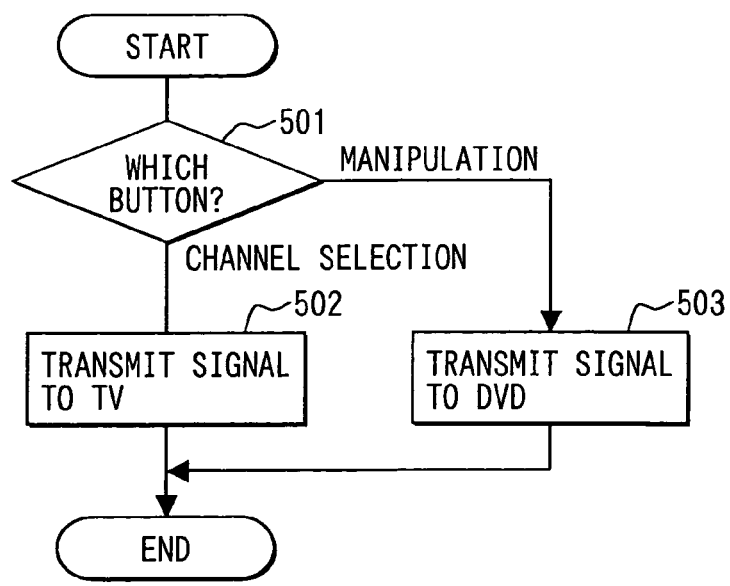
FIG. 7 is a flow chart diagram showing a process where a TV tuner and a DVD are manipulated from a car navigation device in the in-vehicle image display system according to the first embodiment.

Next, a process of manipulating the TV tuner 1 or the DVD player 2 from the car navigation device 3 will be explained with reference to a flow chart in FIG. 7. This process is started when a channel selection button for selecting a channel of the TV tuner 1 or a manipulation button for the DVD player 2 is touched.

At Step 501, the CPU 36 determines which of the channel selection button for the TV tuner 1 or the manipulation button for the DVD player 2 is touched by using a touch position signal outputted from the touch display 32 and the menu window data that the image-drawing IC 35 is drawing on the touch display 41. When the channel selection button is determined to be touched, the process advances to Step 502. When the manipulation button is determined to be touched, the process advances to Step 503.

At Step 502, the CPU 36 outputs a channel selection signal corresponding to the selected button to the communication IC 37 for then transmitting it to the TV tuner 1. At Step 503, the CPU 36 outputs a manipulation signal corresponding to the selected manipulation button to the communication IC 37 for then transmitting it to the DVD player 2.

Here, a process of manipulating the TV tuner 1 or the DVD player 2 from the rear-seat display device 4 is equivalent to the above-described flow chart by replacing, in the flow chart, the touch display 32, the image-drawing IC 35, the CPU 36, and the communication IC 37 with the touch display 41, the image-drawing IC 42, the CPU 44, and the communication IC 45. Therefore, the explanation is eliminated. Further, the menu window can also include other buttons for manipulating the TV tuner 1 or the DVD player 2 in addition to the channel selection button and the manipulation button.

As explained above, the in-vehicle image display system of the first embodiment includes the image-drawing ICs 35, 42 in the car navigation device 3 and the rear-seat display device 4, respectively. The car navigation device 3 interfaces with the TV tuner 1 and the DVD player 2, to forward image data corresponding to a request signal when the request signal is obtained from the rear-seat display device 4. The rear-seat display device 4 obtains the image data from the car navigation device 3 to then convert it to image signals and draw them by using the image-drawing IC 42. Thus, with a simple system structure without installing an image-drawing IC for the rear-seat display device 4 within the car navigation device 3, the different display windows can be drawn in the car navigation device 3 and the rear-seat display device 4, respectively. This provides a favorable aspect to the designing or the costs in the system.

Further, the dedicated line 6 is used for transmitting image data, so that even the image data typically having a large data volume can be transmitted at a high speed. Therefore, displaying can be rapidly performed even when the rear-seat display device 4 displays a menu window that is stored in the image-data storing device 33 in the car navigation device 3. The usability for the user is thereby prevented from being deteriorated. When a menu window on the touch display is used for input or manipulating, the entire menu window must be completely displayed before a manipulation button is touched for input. Therefore, if a long period is required from when the user instructs displaying of the menu window to when the menu window is completely displayed, the usability for the user is very much deteriorated.

Modification 1

Figure 8:
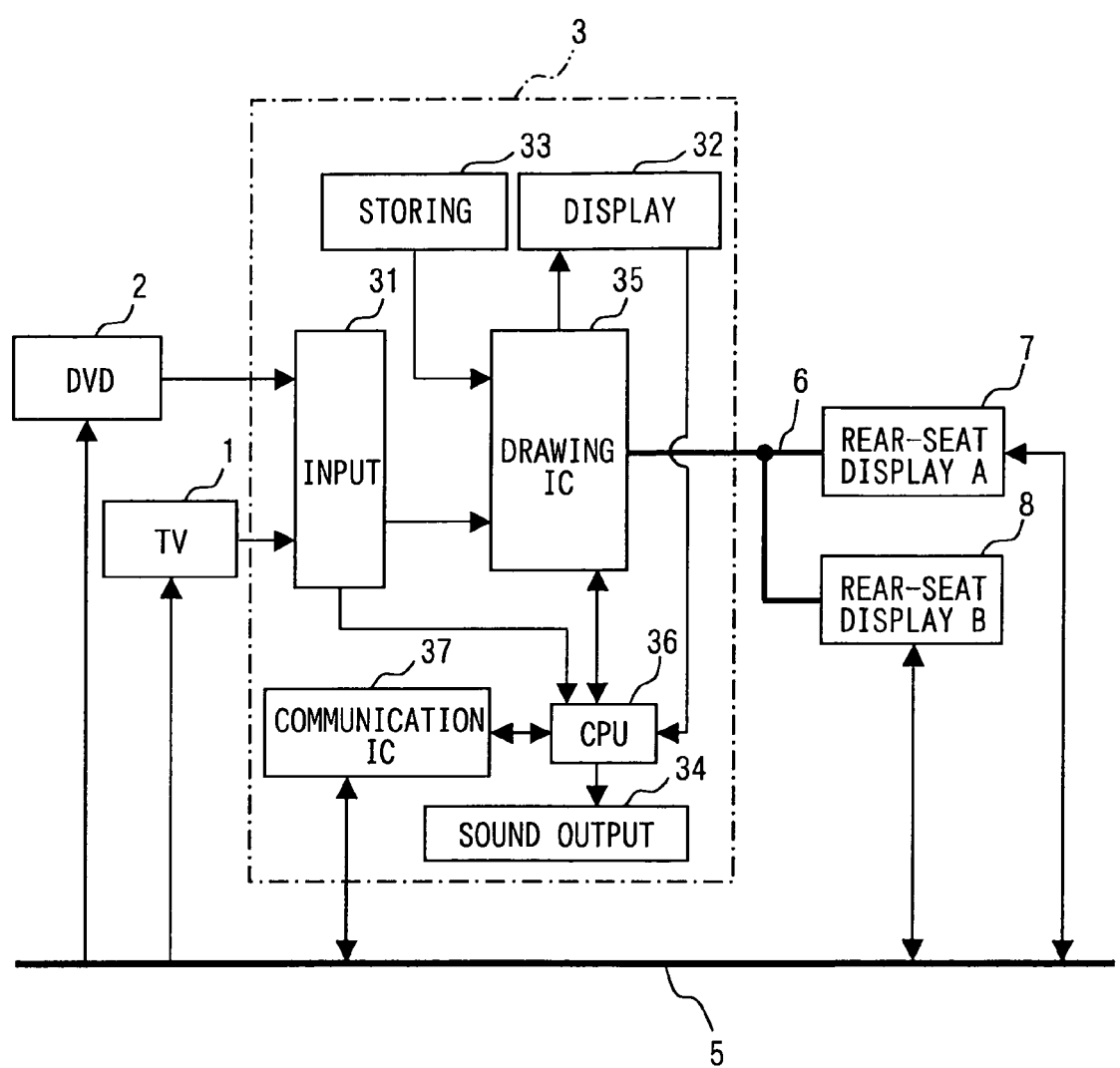
FIG. 8 is a block diagram showing an overall structure of an in-vehicle image display system according to a modification of the first embodiment.

Next, an in-vehicle image display system according to a first modification to the first embodiment will be explained with reference to FIG. 8. This system includes multiple (two) rear-seat displays, which is differentiated from the above embodiment. As shown in FIG. 8, each of a rear-seat display device A 7 and a rear-seat display B 8 includes a function of the rear-seat display device 4 in the above embodiment and further stores an identification code for identifying each of them. These identification codes are used when the rear-seat display device A 7 and the rear-seat display devices B 8 communicate with a car navigation device 3. The other structure is similar to that of the above embodiment, so that the explanation is eliminated here.

Figure 9:
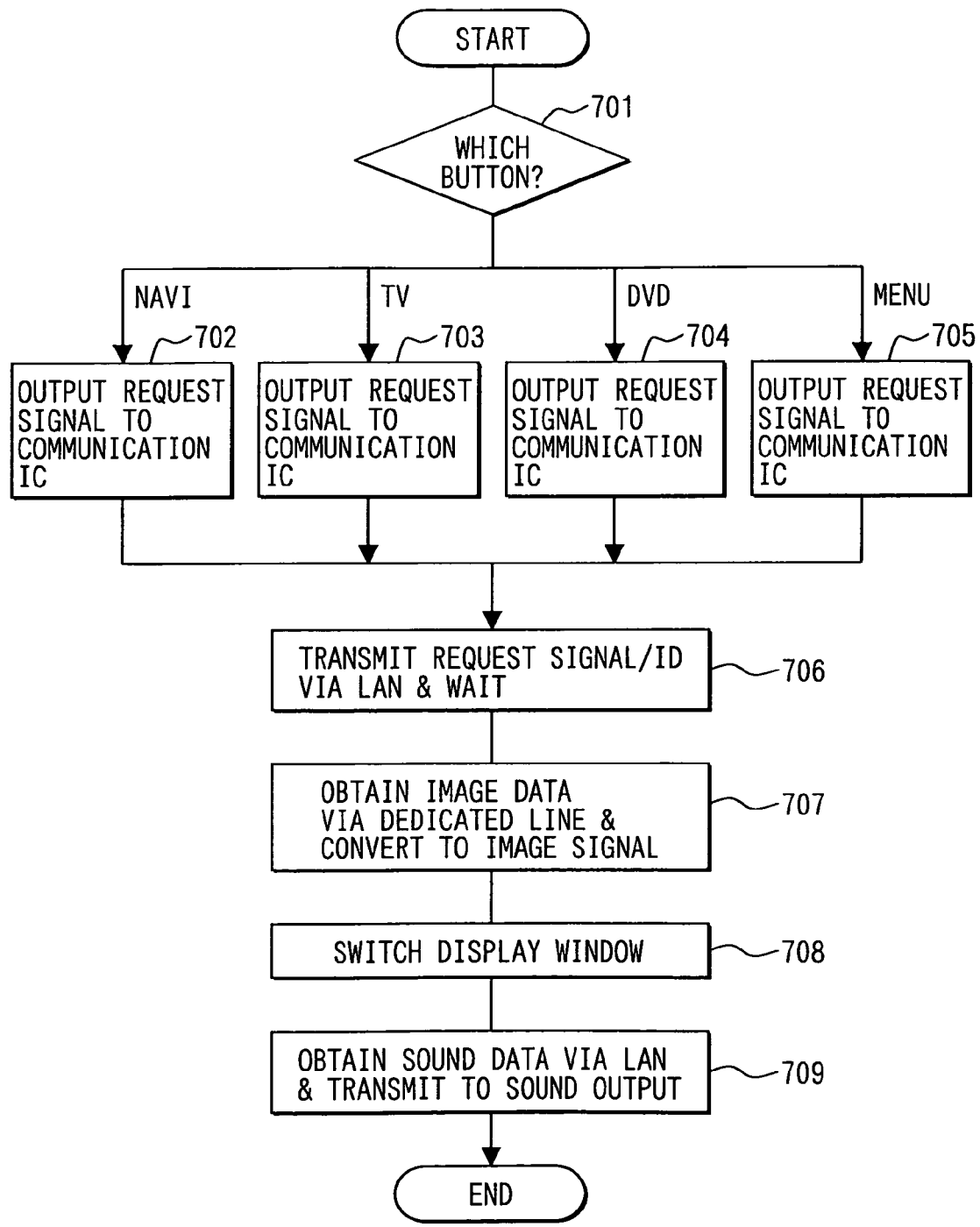
FIG. 9 is a flow chart diagram showing a process for switching display windows on a touch display in a rear-seat display device in the in-vehicle image display system according to the modification of the first embodiment.

Next, a process of switching a display window on a touch display (not shown) in the rear-seat display device A 7 will be explained with reference to a flow chart in FIG. 9. This process is similar to the process in FIG. 5; however, Step 306 in FIG. 5 is replaced by Step 706 in FIG. 9. That is, at Step 706, the communication IC 45 transmits, via the in-vehicle LAN 5 to the car navigation device 3, an identification code in addition to the request signal to then enter a waiting state.

In the above embodiment, only a single rear-seat display device 4 is provided; however, in this first modification, two rear-seat display devices A, B, 7, 8 are provided. When the rear-seat display device 7 A transmits a request signal to the car navigation device 3, attaching of an identification code becomes necessary. Otherwise, the car navigation device 3 cannot determine which of the rear-seat display device A 7 and the rear-seat display device B 8 transmitted the request signal, so that transmission of the image data cannot be executed. Transmitting of the identification code in addition to the request signal can prevent this problem.

Here, a process of switching a display window on a touch display (not shown) in the rear-seat display device B 8 is similar to that for the rear-seat display device A 7, so that the explanation is eliminated here.

Figure 10:
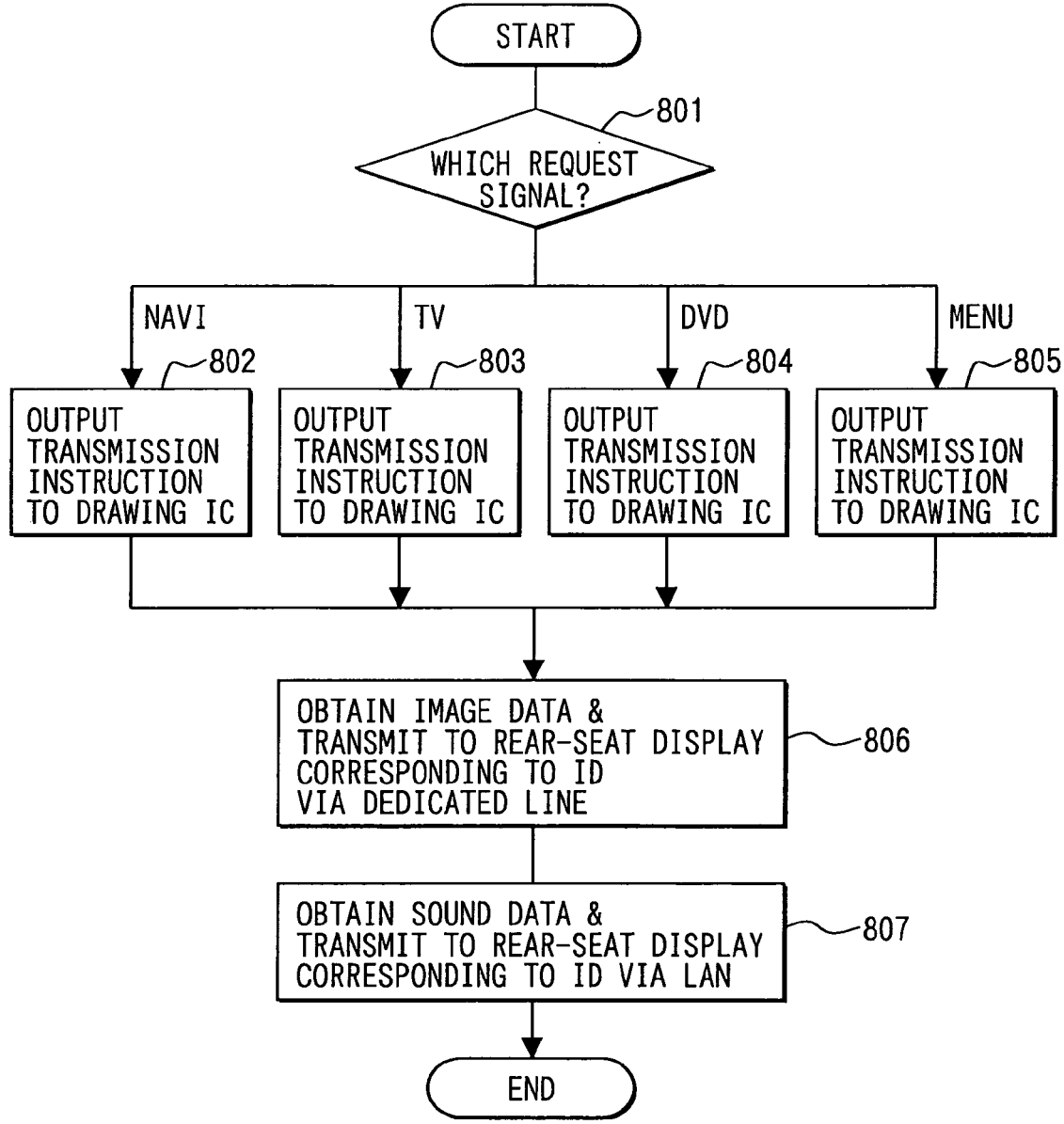
FIG. 10 is a flow chart diagram showing a process where a car navigation device transfers images to two rear-seat display devices in the in-vehicle image display system according to the modification of the first embodiment.

Next, a process of forwarding image data by the car navigation device 3 to the rear-seat display device A 7 will be explained with reference to a flow chart in FIG. 10. This process is similar to the process in FIG. 6; however, Steps 406, 407 in FIG. 6 are replaced by Step 806, 807 in FIG. 10, respectively. That is, at Step 806, the image-drawing IC 35 obtains image data corresponding to a transmission instruction, to then transmit it to the rear-seat display device corresponding to the identification code via the dedicated line 6. Further, at Step 807, the CPU 36 obtains the sound data outputted along with the image data to then forward it to the rear-seat display device corresponding to the identification code via the in-vehicle LAN 5.

As explained above, in this first modification, two rear-seat display devices A, B, 7, 8 are provided. The car navigation device 3 transmits image data and sound data to the rear-seat display device corresponding to the identification code attached to the obtained request signal.

In the above first embodiment, and the first modification of the first embodiment, in-vehicle apparatuses interfacing with this system are a car navigation device 3 (used as a front-seat display), a TV tuner 1, and a DVD player 2. However, in addition to them, any image-output apparatus that outputs images can be favorably included in this system. Further, any image-output apparatus that includes a display window can be also used as a rear-seat display. In this case, when image data is obtained from the image-output apparatus used as the rear-seat display, the front-seat display outputs a request signal to the rear-seat display to then obtain the image data forwarded via the dedicated line 6.

Further, in this first modification, two rear-seat display devices A, B, 7, 8 are provided as a rear-seat display; however, more than two rear-seat display devices can be provided in this system. In this case, each of the rear-seat display devices needs to have an identification code. Further, no rear-seat display device can be provided in this system. That is, a vehicle without a rear seat can also be mounted with this system. Further, in this system, when no person is seated in a rear seat, a rear-seat display is turned off, so that only a front-seat display can be operated.

Modification 2

In the above first embodiment, only the car navigation device 3 includes an external input circuit 31, so that image data requested from the rear-seat display device 4 is forwarded by the car navigation device 3. However, an external input circuit 31 can be included in the rear-seat display device 4 for receiving image data from an image-output apparatus. That is, in a case where multiple image-output apparatuses are mounted in a vehicle, the car navigation device 3 and the rear-seat display device 4 can share obtaining image data from the multiple image-output apparatuses. Here, when image data that is to be displayed in the car navigation device 3 of the front-seat display is inputted to the rear-seat display device 4, the image data is forwarded from the rear-seat display device 4 to the car navigation device 3 via the dedicated line 6.

Second Embodiment

Figure 11:
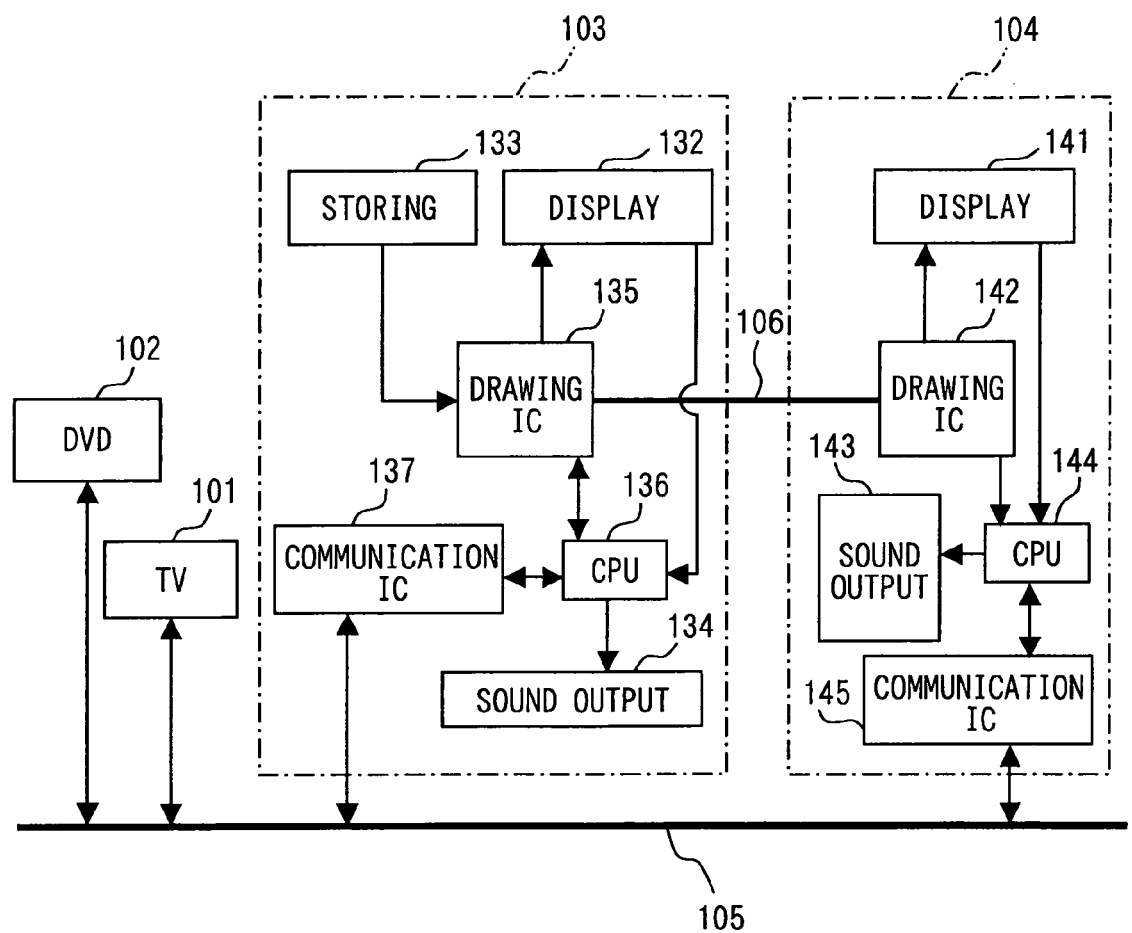
FIG. 11 is a block diagram showing an overall structure of an in-vehicle image display system according to a second embodiment of the present invention.

An in-vehicle image display system according to a second embodiment of the present invention will be explained with reference to FIGS. 11, 12, 13. As shown in FIG. 11, in the second embodiment, an image-output apparatus such as a TV tuner 1 and a DVD player 2 interfaces with the system only via an in-vehicle LAN 105. That is, image data outputted from the image-output apparatus is transmitted via the in-vehicle LAN, in addition to a manipulation signal from a car navigation device 103 or a rear-seat display device 104, which differentiates this embodiment from the first embodiment.

Here, a menu window is stored in an image-data storing device 133 in the car navigation device 103, to thereby be read by an image-drawing IC 135. Therefore, the menu window can be rapidly displayed not only when displayed on a touch display 132 in the car navigation device 103 but also when displayed on a touch display 141 in the rear-seat display device 104.

Figure 12:
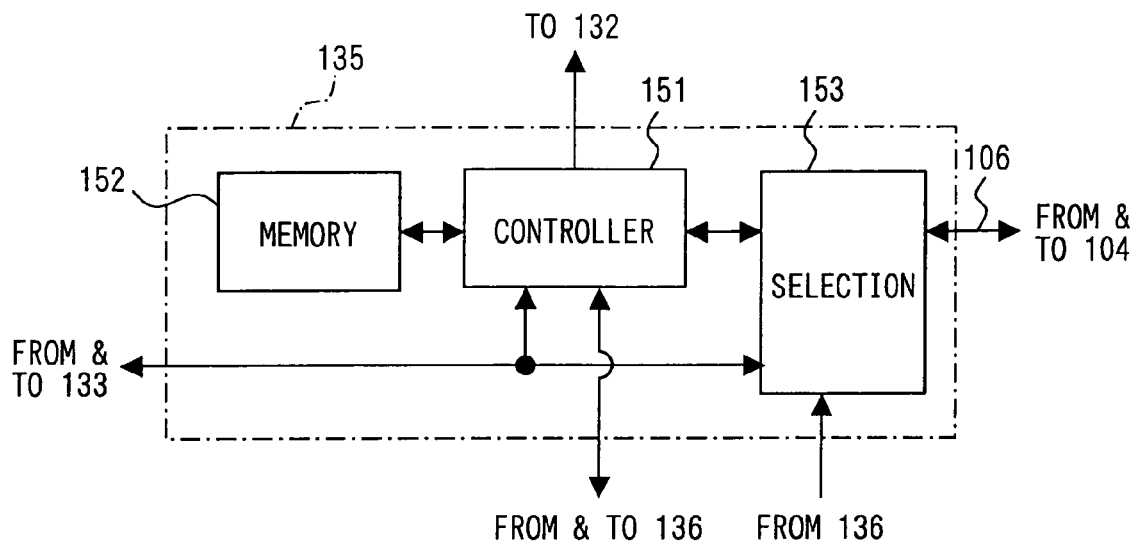
FIG. 12 is a block diagram showing an internal structure of an image-drawing IC in a car navigation device according to the second embodiment.

As shown in FIG. 12 that shows an internal structure of the image-drawing IC 135, image data from the TV tuner 1 and the DVD player 2 are primarily provided to a display controller 151 of the image-drawing IC 135 via a communication IC 137 and a CPU 136. The display controller 151 stores the provided image data in a video memory 152 to simultaneously generate image signals based on the provided image data to thereby output it to the touch display 132.

Figure 13:
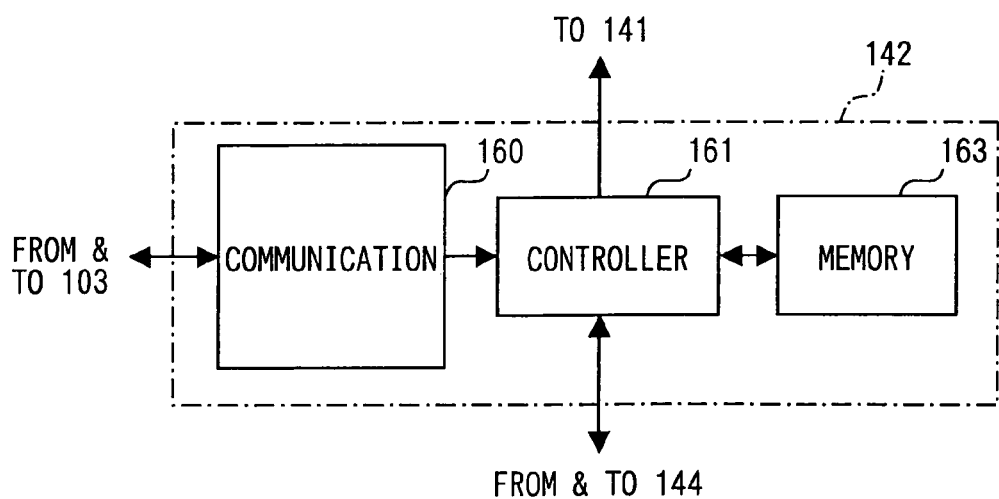
FIG. 13 is a block diagram showing an internal structure of an image-drawing IC in a rear-seat display device according to the second embodiment.

As shown in FIG. 13 that shows an internal structure of the image-drawing IC 142, similarly in the image-drawing IC 135, image data is provided to a display controller 161 of the image-drawing IC 142 via a communication IC 145 and a CPU 144. The display controller 161 stores the provided image data in a video memory 163 to simultaneously generate image signals based on the provided image data to thereby output it to the touch display 141.

Here, when a menu window is displayed in the rear-seat display device 104, a menu window request signal is transmitted to the car navigation device 103, to thereby obtain image data for displaying the menu window, via a dedicated line 106 and a communication circuit 160. In this case, in the car navigation device 103, a selection circuit 153 reads image data of a menu window from the image-data storing device 133, to then transmit it to the rear-seat display device 104.

Further, the car navigation device 103 and the rear-seat display device 104 mutually confirm displayed windows in other device. When a user requests the same window as that is being displayed in the other device, one device outputs to the other device a transmission request. In this case, image signals generated in the image-drawing IC of the other device is transmitted to the one device via the dedicated line 106. The one device that outputs the transmission request directly displays the received image signals by using its display controller when receiving the image signals from the other device via the dedicated line 106.

Thus, when the common window is displayed in both the devices 103, 104, image signals generated in one device is used for the other device to display, so that efficiency in displaying can be enhanced.

In the second embodiment, a structure of the in-vehicle image display system can be optimized not only when only the car navigation device 103 is used but also when the car navigation device 103 is used to be combined with the rear-seat display device 104. Further, transmitting the menu window via the dedicated line 106 achieves rapid displaying, so that deterioration in user's usability can be prevented.

Further, in the second embodiment, the image-data storing device 133 in the car navigation device 103 stores image data for the menu window displayed on the touch display 141 in the rear-seat display device 104. However, an additional memory can be also provided within the rear-seat display device 104 for storing image data for the menu window. In this case, transmission of the image data for the menu window using the dedicated line 106 becomes unnecessary, so that the image data is transmitted via the dedicated line 106 only when the same window is displayed in both the car navigation device 103 and the rear-seat display device 104.

It will be obvious to those skilled in the art that various changes may be made in the above-described embodiments of the present invention. However, the scope of the present invention should be determined by the following claims.

What is claimed is:

1. An in-vehicle image display system for a vehicle, the image display system comprising:
   a primary display device configured to include a first image-drawing unit and a first display screen for displaying a first window;
   a secondary display device configured to include a second image-drawing unit and a second display screen for displaying a second window; and a dedicated line configured to enable the primary display device to dedicatedly communicate with the secondary display device, wherein:

when it is requested that the second window displayed in the second display screen be different from the first window displayed in the first display screen, the first window is displayed in the first display screen based on a first image signal, which is generated by the first image-drawing unit, while the second window is displayed in the second display screen based on a second image signal, which is generated by the second image-drawing unit; and when it is requested that the second window displayed in the second display screen be identical to the first window displayed in the first display screen, the first window is displayed in the first display screen based on the first image signal generated by the first image-drawing unit while the second window is displayed in the second display screen based on the same first image signal, which is generated by the first image-drawing unit instead of the second image-drawing unit and then transferred via the dedicated line to the secondary display device.

2. The in-vehicle image display system of claim 1,
wherein the primary display device is assembled in a navigation apparatus.

3. The in-vehicle image display system of claim 1,
wherein the primary display device is disposed in proximity to a front seat in the vehicle, while the secondary display device is disposed in proximity to a rear seat in the vehicle.

4. An in-vehicle image display system for a vehicle, the image display system comprising:

a single primary display device configured to include a first image-drawing unit and a first display screen for displaying a first window, the primary display device further configured to obtain image data from a plurality of apparatuses provided in the vehicle;

at least one secondary display device configured to include a second image-drawing unit and a second display screen for displaying a second window; and a dedicated line configured to enable the primary display device to dedicatedly communicate with the secondary display device, wherein:

when it is requested that the second window displayed in the second display screen be different from the first window displayed in the first display screen, the first window is displayed in the first display screen based on a first image signal, the image data being generated by the first image-drawing unit using image data obtained from one of the plurality of apparatuses, while the second window is displayed in the second display screen based on a second image signal, the second image signal being generated by the second image-drawing unit using image data, the image data being obtained by the primary display device from one of the plurality of apparatuses and then transferred via the dedicated line to the secondary display device; and when it is requested that the second window displayed in the second display screen be identical to the first window displayed in the first display screen, the first window is displayed in the first display screen based on the first image signal generated by the first image-drawing unit using image data obtained from one of the plurality of apparatuses while the second window is displayed in the second display screen based on the same first image signal, which is generated by the first image-drawing unit instead of the second image-drawing unit and then transferred via the dedicated line to the secondary display device.

5. The in-vehicle image display system of claim 4, further comprising:

a designating unit configured to designate first image data to be displayed in the first display screen as the first window and second image data to be displayed in the second display screen as the second window, wherein the primary display device obtains, from among image data outputted from the plurality of apparatuses, the first image data and the second image data designated by the designating unit.

6. The in-vehicle image display system of claim 4, further comprising:

a manipulating unit that manipulates each of the apparatuses, wherein the manipulating unit manipulates each of the apparatuses via a local area network provided in the vehicle, the local area network configured to interface with the apparatuses.

7. The in-vehicle image display system of claim 4,
wherein the apparatuses include at least two of a vehicular navigation apparatus, a TV tuner, and a DVD player.

8. The in-vehicle image display system of claim 4,
wherein the primary display device is assembled in a vehicular navigation apparatus, the vehicular navigation apparatus being included in one of the apparatuses.

9. The in-vehicle image display system of claim 4, wherein:

each of the primary display device and the secondary display device is further configured to include a sound output unit that outputs a sound, wherein, when a certain apparatus included in the apparatuses outputs certain sound data in addition to certain image data, the primary display device obtains the certain sound data in addition to the certain image data from the certain apparatus and outputs the obtained certain sound data to the sound output unit of one of the primary display device and the secondary display device that displays the certain image data.

10. The in-vehicle image display system of claim 4,
wherein the primary display device is disposed in proximity to a front seat in the vehicle, while the secondary display device is disposed in proximity to a rear seat in the vehicle.

11. The in-vehicle image display system of claim 5,
wherein the designating unit causes the first display screen and the second display screen to display a menu relating to image data outputted from the apparatuses.

12. The in-vehicle image display system of claim 11,
wherein when the designating unit causes the second display screen to display the menu window, the designating unit transmits image data of the menu window to the secondary display device using the dedicated line.

* * * * *